United States Patent [19]

Recker

[11] 3,969,033
[45] July 13, 1976

[54] TORQUE TRANSMITTING COUPLING

[76] Inventor: Florian B. Recker, 802 First St., SE., Dyersville, Iowa 52040

[22] Filed: July 10, 1975

[21] Appl. No.: 594,784

[52] U.S. Cl. ............................. 403/322; 403/325; 403/359; 64/6; 403/19; 403/23; 403/33; 403/16
[51] Int. Cl.² .......................................... F16B 7/00
[58] Field of Search .......... 403/322, 325, 359, 316, 403/317; 285/316, 85, 86, 308, 315, 317; 64/6, 32 P, 4

[56] References Cited
UNITED STATES PATENTS

| | | | |
|---|---|---|---|
| 2,448,278 | 8/1948 | Ronning | 403/359 |
| 3,179,450 | 4/1965 | Recker | 403/325 |
| 3,357,206 | 12/1967 | Christie | 64/6 |

FOREIGN PATENTS OR APPLICATIONS

| | | | |
|---|---|---|---|
| 1,102,886 | 5/1955 | France | 403/322 |

Primary Examiner—Andrew V. Kundrat
Attorney, Agent, or Firm—Henderson, Strom & Sturm

[57] ABSTRACT

A torque transmitting coupling of a type having a housing with an opening therein which has a plurality of longitudinal splines along one part thereof and having another portion thereof which is circular. A sleeve is rotatably disposed within the circular part of the opening in the housing and this sleeve has a plurality of splines around the inner periphery thereof. The sleeve has a pin attached thereto which extends through a radial slot in the housing. A collar is slideably received on the exterior of the housing and is slideably movable in a longitudinal direction only and is biased to one position. Camming means are formed in the collar for moving the pin attached to the splined sleeve and thereby for rotating the splined sleeve from a first position which locks a shaft into the coupling to a second position which unlocks the shaft to be used in conjunction with the coupling. A free spinning shield is disposed around the housing. Selective longitudinal movement of the shield locks or unlocks the coupling by moving the collar. A mechanism for moving the shield and thereby for locking or unlocking the coupling is also provided.

14 Claims, 10 Drawing Figures

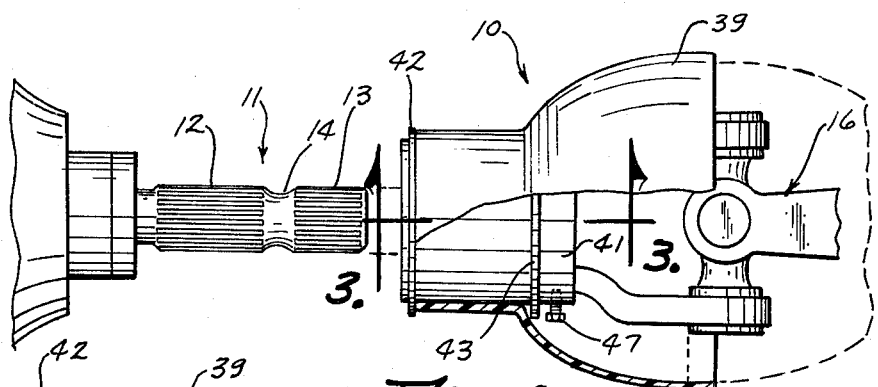
Fig. 1
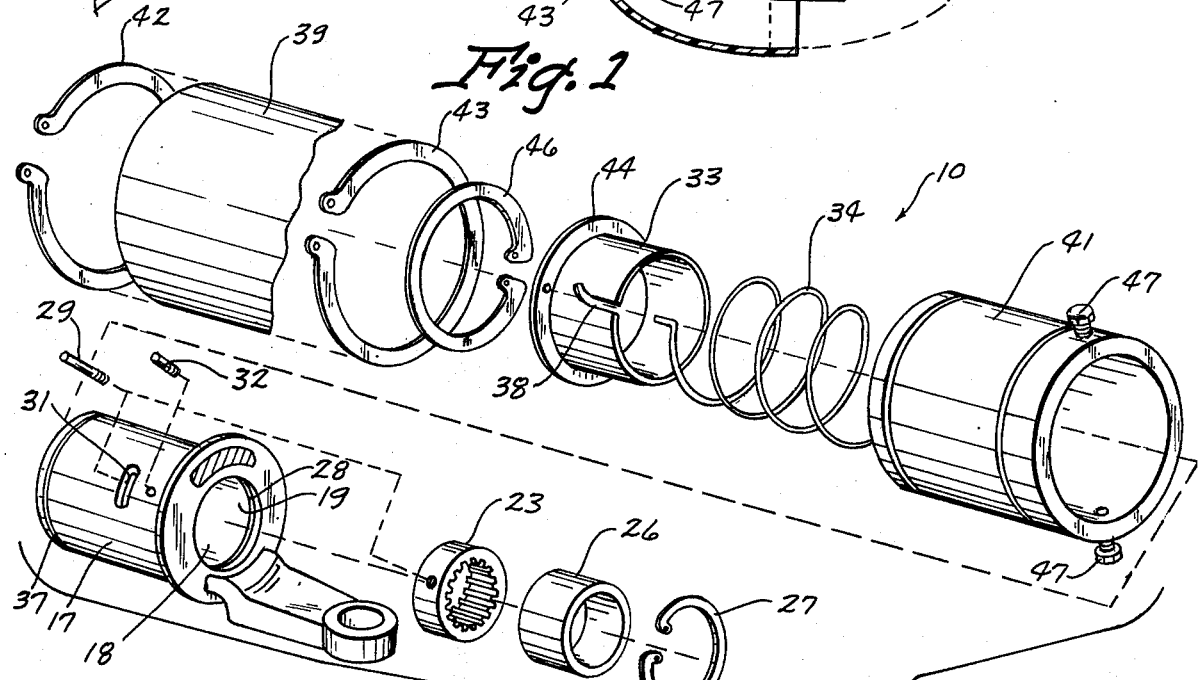
Fig. 2
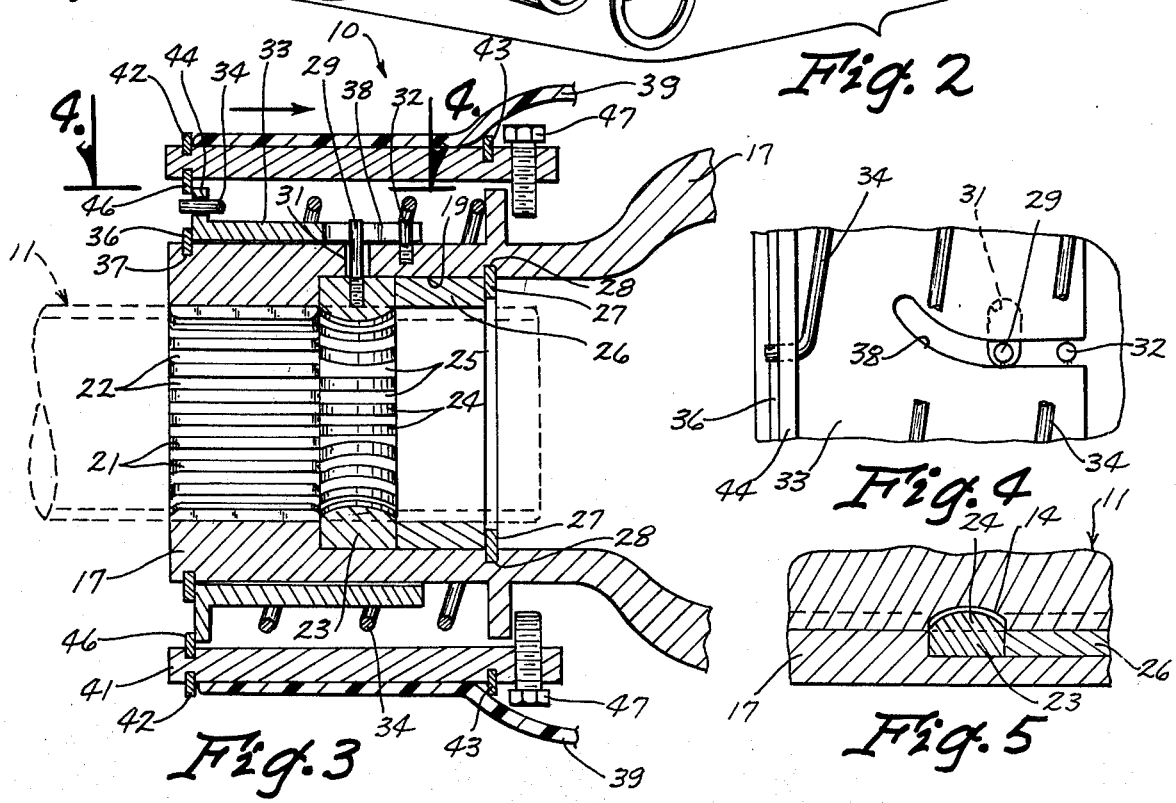
Fig. 3
Fig. 4
Fig. 5

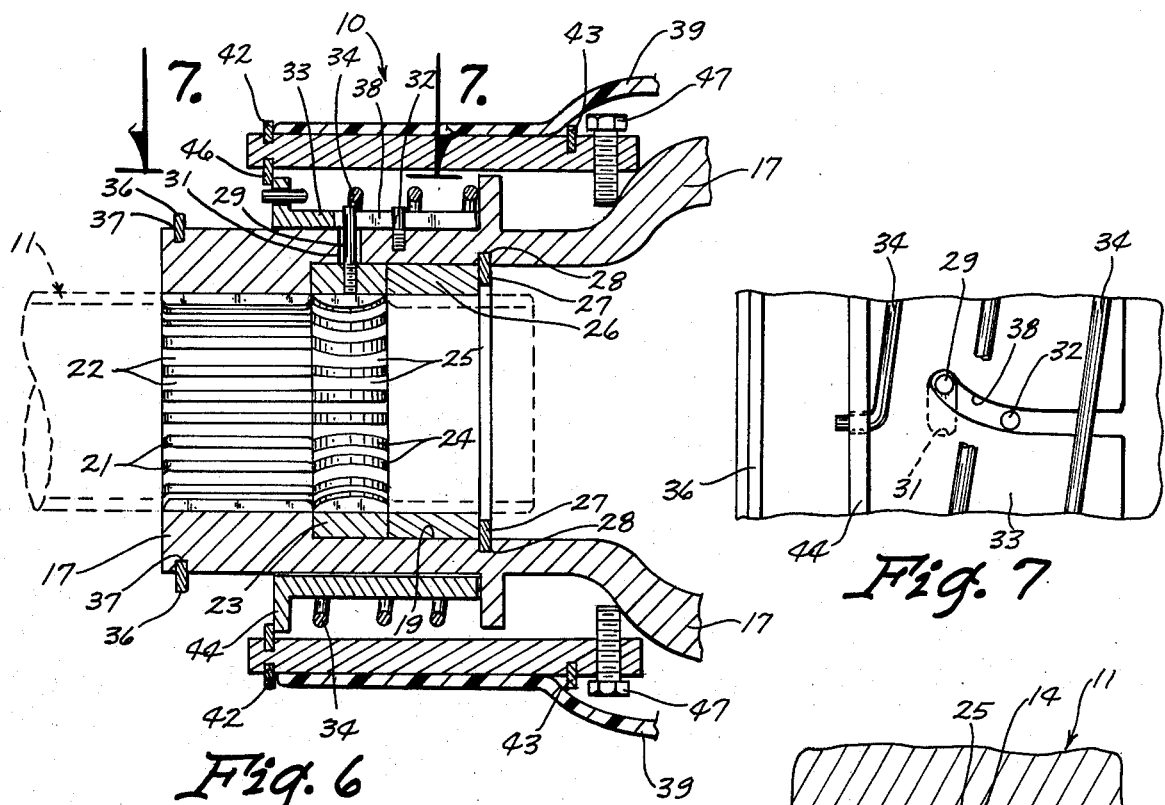
Fig. 6
Fig. 7
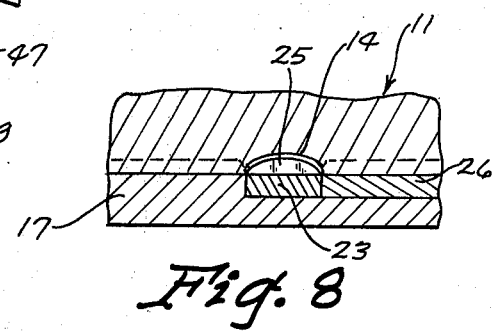
Fig. 8
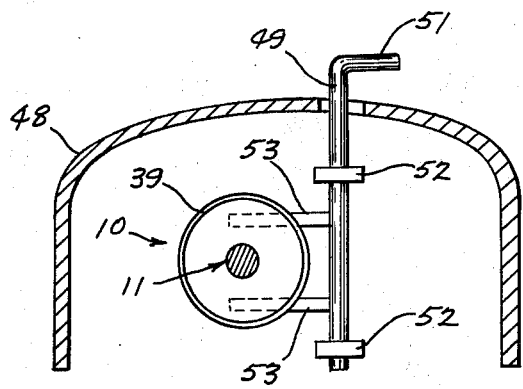
Fig. 9
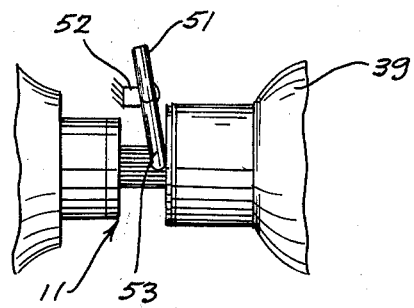
Fig. 10

3,969,033

TORQUE TRANSMITTING COUPLING

BACKGROUND OF THE INVENTION

The present invention relates generally to shaft couplings and more particularly to a shaft coupling for transmitting a torque force from one shaft to another.

The problem of how to couple one shaft to another for transmitting a torque force is a longstanding one. This has particularly been a problem in the farming community wherein the power take-off of an agricultural tractor frequently needs to be connected and disconnected to utilize one implement and then another. This problem has been solved in the past in one degree or another, and one of the most commercially successful of these solutions is a connection of the type disclosed in U.S. Pat. No. 2,448,278, which was patented in 1948.

In U.S. Pat. No. 2,448,278 a pin is biased to one position within a housing so that it will contact one spline of a power take-off to thereby hold the coupling together. In another position of the pin, it is moved so that it does not block or contact any of the splines and thereby allows the housing to be removed from the power take-off shaft.

Since the time that the coupling disclosed in U.S. Pat. No. 2,448,278 was developed, the horsepower rating of typical agricultural tractors has continued to increase. Because of the very high torque which can be developed from the power take-offs of modern day agricultural tractors, it is desirable that the coupling be held at more than one point and on more than one spline.

Additionally, it is highly desirable to have a coupling which has no external projections thereon, to prevent such projections from catching a tractor operator's clothes or body limbs. It is for this reason that many various types of shields and guards have been developed to be placed around the couplings of the type shown in U.S. Pat. No. 2,448,278. It has been found, however, that these shields are often removed, or not used at all, because of the inconvenience they cause when a person is trying to get the coupling on and off of a tractor power take-off shaft. Consequently, if a coupling could be designed to be operated without the need for removing the shield, it would be much safer and convenient.

While certain couplers have been developed to avoid excess projections, for example as shown in U.S. Pat. No. 3,480,310, there has not been a commercial coupling having the positive coupling to each and every spline which is highly desirable for the high horsepower tractors of today which can also be coupled and uncoupled without removing the required shield. Furthermore, in trying to eliminate the projections, some of the couplings developed have become unduly complicated and uneconomical to manufacture.

A French Pat. No. 1,102,886, patented in 1955 discloses a design for locking on all of the splines of a power take-off shaft but it has not become a commercial success, at least not in this country, presumably because of its somewhat complicated structure for positioning and biasing the locking splines.

SUMMARY OF THE INVENTION

The present invention relates to a torque transmitting coupling which is operable with a safety shield attached thereto. The present invention has a housing adapted to receive a non-circular shaft into a complimentarily shaped non-circular opening in the housing. A sleeve, also of a shape complimentary to the shaft and housing is rotatably disposed within a portion of the opening. A collar is disposed around the housing and has camming means therein such that longitudinal movement of the collar along the housing cams a projection leading from the sleeve to thereby move the sleeve to and from locking and unlocking positions. A compression spring biases the collar and thereby the sleeve to a locked position. A mechanism is also provided for moving the shield, collar and sleeve from the first position, which is a locked position, to a second position which is an unlocked position.

An object of the present invention is to provide a torque transmitting coupling which will withstand a very high torque force.

Another object of the invention is to provide a torque transmitting coupling which is extremely easy and simple to couple and uncouple.

A further object of the invention is to provide a torque transmitting coupling which has a shield therearound and which is operable to be coupled and uncoupled without removal of the shield.

Still another object is to provide a torque transmitting coupling which is safe and dependable to use as well as being economical to produce.

Other objects, advantages, and novel features of the present invention will become apparent from the following detailed description of the invention when considered in conjunction with the accompanying drawings.

BRIEF DESCRIPTION OF THE DRAWINGS

FIG. 1 is a plan view of the present invention in readiness to be connected to the power take-off of an agricultural tractor;

FIG. 2 is an exploded view of the present invention;

FIG. 3 is a cross sectional view of the present invention taken along the line 3—3 of FIG. 1;

FIG. 4 is a partial view taken along line 4—4 of FIG. 3;

FIG. 5 is a cross sectional view showing the invention locked to a shaft;

FIG. 6 is a cross sectional view like FIG. 3 but showing the invention in an unlocked position;

FIG. 7 is a view taken along line 7—7 of FIG. 6 and showing the camming mechanism of the present invention;

FIG. 8 is a cross sectional view of the present invention showing the shaft and coupler in an unlocked position;

FIG. 9 is a view of a mechanism for moving the shield from the position in FIG. 3 to the position in FIG. 6, which action effects a selective locking or unlocking of the present invention; and FIG. 10 is a top view of FIG. 9.

DESCRIPTION OF THE PREFERRED EMBODIMENT

Referring now to the drawings wherein like reference numerals designate identical or corresponding parts throughout the several views, FIG. 1 shows the torque transmitting coupling 10 of the present invention in readiness to be connected to the power take-off shaft 11 of an agricultural tractor (not shown). The power take-off shaft 11 has a series of splines 12 and 13 disposed around the periphery thereof and separated by a depression or groove 14. A universal joint structure 16 is clearly shown in FIG. 1 and a portion of this universal joint structure forms a part of the housing 17 of the present invention. The housing 17 has an opening 18 therein. This opening 18 has a portion 19 thereof which is circular and a portion thereof which has splines 21 and grooves 22 about the periphery thereof.

A sleeve 23 is disposed within the circular portion 19 of the opening 18 in the housing 17. This sleeve 23 has a plurality of splines 24 and grooves 25 around the inner periphery thereof. These splines and grooves 24 and 25 of the sleeve 23 are substantially of the same spacing and configuration as the splines and grooves 21 and 22 in the opening 18 in the housing 17. A secondary sleeve 26 is also received in the circular portion 19 of the opening 18 and is locked in place by a snap ring 27 which is received in a groove 28 in the housing 17.

A pin 29 is threadedly received within the sleeve 23, and this pin 29 extends through a radial slot 31 in the housing 17. Another pin 32 is threadedly received into the housing 17 as can clearly be seen in FIGS. 3, 4, 6 and 7.

A collar 33 is slideably received on the housing 17 and this collar 33 is biased by a spring 34 to the position shown in FIG. 3. A snap ring 36 received in a slot 37 in the housing 17 prevents the collar 33 from moving any further to the left than the position as shown in FIG. 3.

A it slot 38 is formed in the collar 33 and the pins 29 and 32 extend upwardly into this camming slot at all times. Referring to FIG. 4 is can be seen that both of the pins 29 and 32 are disposed within the straight portion of the slot 38 when the spring 34 has moved the collar 33 to the first and left-most position as can clearly be seen in FIG. 3. Because of the position of the pin 29 at the lower side of the radial slot 31 in the housing 17, the sleeve 23 is positioned in the locked position as shown in FIG. 3. When the collar 33 is moved from the position as shown in FIGS. 3 and 4 to the position shown in FIGS. 6 and 7, as will be explained below, the pin 29 is moved from the position shown in FIG. 4 to the position shown in FIG. 7 by the action of the camming slot 38 in cooperation with the pins 29 and 32. It can be seen that the pin 32 merely prevents the collar 33 from rotating with respect to the housing 17 during this movement. When the pin 29 is moved from the position shown in FIG. 4 to the position shown in FIG. 7, this causes the sleeve 23 to move from the locked position as shown in FIG. 3 to the unlocked position as shown in FIG. 6.

A free spinning guard 39 is disposed around the housing 17 as is best shown in FIGS. 1, 3 and 6. The guard 39 is held onto a cylindrical member 41 by means of a pair of snap rings 42 and 43. This guard 39 is biased to the position as shown in FIG. 3 because of the cooperation of the portion 44 of the collar 33 with the snap ring 46 attached to the cylindrical member 41. A plurality of adjusting screws 47 are also disposed through the cylindrical member 41 as can be seen clearly in FIGS. 3 and 6. The adjusting screws or bolts 47 are designed to be in abutment with the housing 17 in the second position thereof as shown in FIG. 6.

Referring now to FIG. 9, a tractor power take-off guard 48 is normally attached directly to a tractor. The present invention 10 would be located below this tractor power take-off guard as shown in FIG. 9. A rod 49 having a handle 51 thereon is rotatably mounted by bearing members 52. A pair of arms 53 extend outwardly from the rod 49 and these arms 53 are designed to come in contact with the guard 39 in order to push it from the position to which it is biased as shown in FIG. 3, to the position in FIG. 6, when so desired.

In operation, the tractor would be backed up to an implement having a coupler 10 of the present invention attached thereto, through a universal joint 16 as shown in FIG. 1. The tractor operator would first be sure that the power take-off was disengaged, such that the shaft 11 is not in motion. The coupler 10 would then be manually placed onto the power take-off shaft 11, by first manually pushing the guard 39 from the position as shown in FIG. 3 to the position as shown in FIG. 6. This would effect an unlocking of the device such that the splines 24 on the sleeve 23 are aligned with the splines 21 on the housing. In such a position the power take-off shaft 11 will easily slide into the coupler 10. Once this has been done, then the guard 39 is released and the biasing spring 34 will force the collar 33, the guard 39 and, because of the camming cooperation between the pins 29 and 32 and the camming slot 38, the sleeve 23 will be rotated from the position as shown in FIG. 6 to the position as shown in FIG. 3. It is to be understood that the sleeve 23 is free to rotate within the groove 14 of the power take-off shaft 11. Once the sleeve 23 has been rotated to the locked position as shown in FIG. 3, the tractor operator may proceed to utilize the implement attached thereto.

When it is desired to uncouple the implement from the tractor, the tractor operator can rotate the rod 49 by grasping the handle 51 (FIG. 9) to thereby push the guard 39 from the position as shown in FIG. 3 to the position as shown in FIG. 6, to thereby unlock the coupler 10 from the shaft 11. The coupler 10 can then be easily slid off of the shaft 11. The operator may then proceed to utilize another implement as desired by repeating the process referred to above.

Accordingly, it is noted that the disclosed embodiment of the present invention accomplishes all of the objects referred to above. Obviously many modifications and variations of the present invention are possible in light of the above teachings. It is therefore to be understood that, within the scope of the appended claims, the invention may be practiced otherwise than as specifically described.

I claim:
1. A torque transmitting coupling comprising:
a housing;
an opening in said housing, a portion of said opening being circular and a portion of said opening being non-circular, said opening being adapted to receive a non-circular portion of a shaft;
a sleeve rotatably disposed within said circular portion of said opening, the inner configuration of said sleeve being of the same general shape as the shape of the noncircular portion of the opening in the housing;
a collar surrounding a portion of said housing, said collar being longitudinally slidable and having a first position and a second position;
means for preventing said collar from rotating with respect to the housing;
a radial slot formed in said housing;
a pin connected to said sleeve and extending radially therefrom, a portion of said pin being disposed in said radial slot and a portion thereof extending beyond said radial slot in the housing; and
camming means connected to said collar for moving said pin and thereby said sleeve to one position when said collar is moved to said first position and for moving said pin and thereby said sleeve to another position when the collar is mvoed to the second position.

2. A coupling as defined in claim 1 including means for biasing said collar to said first position.

3. A coupling as defined in claim 1 wherein said non-circular portion of the opening in said housing has a series of equidistantly spaced longitudinal grooves and splines around the inner periphery thereof.

4. A coupling as defined in claim 3 wherein a shaft is adapted to be received in the non-circular portion of the opening in the housing, said shaft having a shape complimentary to the groove and spline shape of said opening and further having an intermediate annular section of said shaft with the splines removed, said annular section being adapted to receive a portion of said sleeve.

5. A coupling as defined in claim 4 wherein said shaft has twenty-one splines about the periphery thereof.

6. A coupling as defined in claim 4 wherein said shaft has six splines around the periphery thereof.

7. A coupling as defined in claim 1 wherein said camming means comprises a slot formed in said collar.

8. A coupling as defined in claim 7 wherein said slot includes a straight portion and a curved portion.

9. A coupling as defined in claim 8 wherein said means for preventing the collar from rotating includes a pin connected to said housing and extending into the straight portion of said slot.

10. A coupling as defined in claim 8 wherein the pin connected to said sleeve extends into the curved portion of said slot.

11. A coupling as defined in claim 1 having means for shielding said coupling including:
   a cylindrical portion freely rotatable about said housing;
   abutment means on said cylindrical portion for abutting a portion of said collar whereby said cylindrical portion is also biased to said first position by said biasing means and whereby movement of said cylindrical portion from said first position to the second position effects movement of the collar from the first position to the second position.

12. A coupling as defined in claim 11 including means for moving said shielding means and the cylindrical portion thereof from the first to the second position.

13. A coupling as defined in claim 12 wherein said means for moving the shielding means comprises a rod substantially normal to the longitudinal axis of said opening in the housing, said rod being rotatably mounted to a prime mover and having at least one projection thereof for contacting said shielding means for selectively moving the shielding means from the first position thereof to the second position thereof.

14. A coupling as defined in claim 1 including a projection connected to said housing for preventing the movement of said collar in one longitudinal direction when the collar is in said first position whereby the collar is maintained on the housing.

* * * * *